July 8, 1947. G. L. CLAPP Re. 22,895

FORK LIFT TRUCK

Original Filed April 30, 1945

INVENTOR.
George L. Clapp
BY
William F. Diamond
ATTORNEY

Reissued July 8, 1947

Re. 22,895

UNITED STATES PATENT OFFICE 22,895

FORK LIFT TRUCK

George L. Clapp, United States Army,
Pasco, Wash.

Original No. 2,387,744, dated October 30, 1945, Serial No. 591,044, April 30, 1945. Application for reissue September 25, 1946, Serial No. 699,097

6 Claims. (Cl. 214—65)

(Granted under the act of March 3, 1883, as amended April 30, 1928; 370 O. G. 757)

The invention described herein if patented may be manufactured and used by or for the Government for governmental purposes, without the payment to me of any royalty thereon.

This invention relates to industrial trucks of the fork-lift type and refers specifically to an attachment thereto whereby a conventional fork-lift truck may be temporarily converted into a crane.

An object of this invention is to provide a means which will enable quick and easy conversion and reconversion from fork-lift truck to crane and vice versa.

Another object is to provide a means for temporarily converting a fork-lift truck which does not require the use of bolts or similar fastening devices.

Further objects, advantages and features will be apparent from the following specification read in conjunction with the accompanying drawing in which.

Industrial trucks of the fork-lift type are used in warehouses, factories and docks to move matériel from one point to another. The matériel is carried on pallets which are picked up by lifting fingers mounted at the front of the truck. Many types of matériel, because of their configuration, cannot be handled adequately by conventional fork-lift trucks. Articles, the length of which is several times greater than the width, are more difficult to handle than articles which are square in configuration, for example.

In the movement of matériel from one location to another, especially in warehouses, efficient use of storage space requires that as many articles as possible be piled tier upon tier. Articles of more compact dimensions present little difficulty. However, in the case of elongated articles, it is difficult and sometimes impossible to stack them very high by using the conventional fork-lift truck in the conventional manner.

Thus it may be seen that the normal use of the conventional fork-lift truck is limited in its scope. Other equipment must be available to properly handle articles which do not readily lend themselves to handling by fork-lift trucks. An object of my invention, therefore, is to provide an attachment whereby the conventional fork-lift truck may be temporarily converted to a crane, thus dispensing with the requirement for additional warehouse equipment. The crane is used to move matériel which cannot be adequately handled by the fork-lift truck operating in the normal manner.

Figure 1:
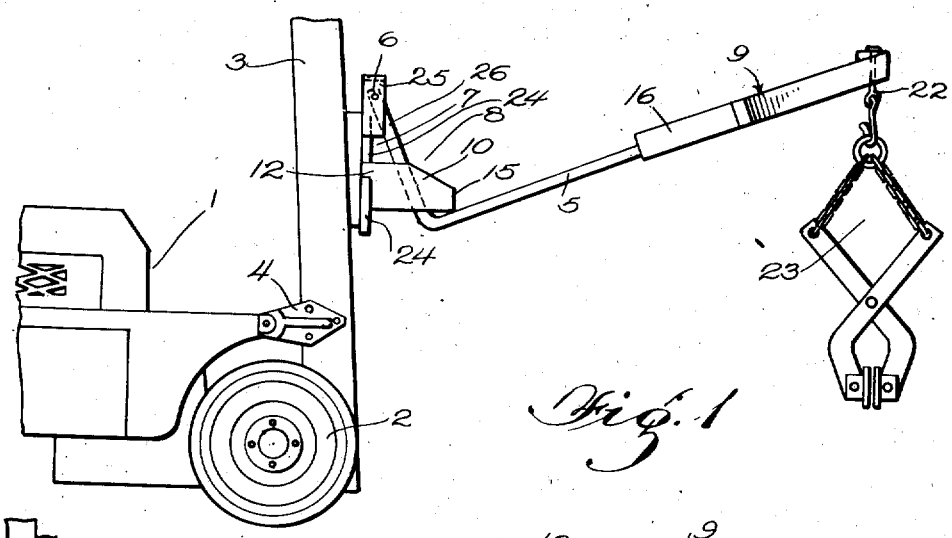
Figure 1 is a side elevational view of the front of a fork-lift truck equipped with the crane assembly of my invention.
Figure 2:
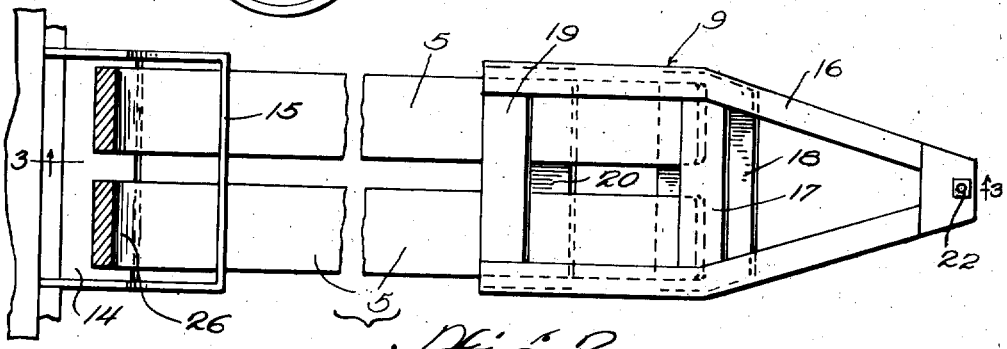
Figure 2 is a top plan view of the crane assembly of my invention showing the manner in which it fits on the truck lifting fingers.

Referring to the accompanying drawing, and more specifically to Figure 1 thereof, the front of a conventional fork-lift truck has been shown to more clearly illustrate the relationship which the attachment of my invention bears thereto. The truck, indicated generally by the numeral 1, is provided at its forward end with drive wheels 2. Lifting mechanism supports 3 are attached to the front of the truck by brackets 4. Substantially L-shaped lifting fingers 5 are pivotally mounted on a shaft 6 which is mounted in a frame 7. The frame 7 comprises a pair of vertical plates 24 and a bracket 25 in which the shaft 6 is supported. This frame 7 is attached to the lifting mechanism of the fork-lift truck which is mounted between the supports 3. In the conventional fork-lift truck, vertical arms 26 of the lifting fingers 5 normally rest against the vertical plates 24.

Generally speaking, the attachment which enables the truck to operate as a crane comprises two basic assemblies, a heel support 8 and a boom extension. The heel support 8 cants the lifting fingers 5 at a fixed angle of inclination from the horizontal. The boom extension 9 is mounted on the free end of the lifting fingers 5 and forms an extension thereof.

The heel support 8 is a metal casting comprising side frames 10 and 11 with lugs 12 and 13 projecting from the upper rear ends thereof, a rear plate 14 and a front plate 15 disposed at the rear and front respectively between said side frames. Heel support 8 interfits with lifting fingers 5.

The boom extension 9 is a metal casting comprising a frame 16, an upper center cross member 17 and a lower center cross member 18 disposed between the sides of the frame 16 at the center thereof, an upper rear cross member 19 and a lower rear cross member 20 disposed between the parallel sides of the frame 16 at the base thereof, and stops 21 disposed between the upper and the lower center cross members 17 and 18 and adjacent each inner wall of the frame 16. An eye bolt 22 is mounted at the apex of the frame 16. To it may be connected any suitable mechanism 23 for engaging the work.

In preparing the fork-lift truck for use as a crane, the heel support 8 is installed first. It is threaded upon the lifting fingers 5 with its rear plate 14 beneath them and its front plate 15 above them. It is mounted by positioning it so that the lugs 12 and 13 rest on top of the lower vertical plate 24, the rear edge of the side frames 10 and 11 and the rear plate 14 are flush with the face of the lower vertical plate 24, and the lower edge of the front plate 15 rests in the cradle of the substantially L-shaped lifting fingers 5. No bolts or other fastening devices are necessary. When in position, the heel support 8 firmly supports the lifting fingers 5 in position at a fixed angle of inclination from the horizontal.

Figure 3:
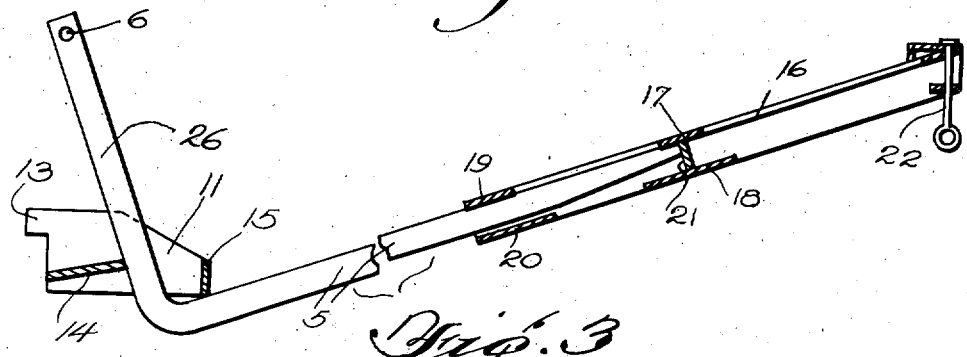
Figure 3 is a sectional view taken along the lines 3—3 of Figure 2.

The boom extension 9 is mounted on the free end of the lifting fingers 5 by threading the frame 16 upon the fingers, with the cross member 19 above and the cross member 20 beneath the fingers, until the tips of the fingers contact the stops 21 projecting inwardly from the frame 16 at a point adjacent the center cross members 17 and 18, as shown in Figure 3. Due to the angle of inclination of the lifting fingers, no bolts or similar means are necessary to maintain the boom extension in position. The apex of the converging portion of frame 16 of the boom extension 9 which projects beyond lifting fingers 5 is provided with a conventional means, such as an eye bolt 22, for supporting a tong assembly 23 or some similar means for engaging the object or article to be moved.

Only a very few minutes are required to convert the truck for use as a crane. No bolts or similar locking or securing devices are necessary when installing the boom extension and the heel support. The heel support is constructed so that any downward or rearward force exerted on the lifting fingers or on the heel support is transmitted to the vertical plates 24, thus locking the heel support more securely in place. Movement of the boom extension 9 along the longitudinal axis of the lifting fingers 5 is limited by the stops 21 and by the angle of inclination of the lifting fingers themselves. Movement of the boom extension along the vertical axis of the lifting fingers is limited by the center cross members 17 and 18, and the rear cross members 19 and 20.

When in position, the heel support 8 firmly supports the lifting fingers 5 at a fixed angle of inclination from the horizontal. In order that the greatest possible operating range of the fork-lift truck lifting mechanism in the vertical plane be utilized, it is preferred that this canting be sufficient to permit the work-engaging mechanism 23 to clear the floor or ground when the lifting fingers have been moved to their lowest position in the vertical plane.

I claim:

1. The combination, with a lift truck having a vertically movable, substantially L-shaped, load carrying member extending laterally therefrom, and a frame to which the end of one arm of said load carrying member is connected: of a support, upon which said load carrying member rests, for canting said laterally extending load carrying member at a predetermined angle with respect to said frame, said support comprising an apertured frame interfitting with said load carrying member and having a portion thereof disposed between said member and said frame; and means mounted on the free end of said load carrying member to support a load grasping means.

2. The combination, with a lift truck having a vertically movable, substantially L-shaped, load carrying member extending laterally therefrom, and a frame to which the end of one arm of said load carrying member is connected: of a support, upon which said load carrying member rests, for canting said laterally extending load-carrying member at a predetermined angle with respect to said frame, said support comprising an apertured frame interfitting with said load carrying member and having a portion thereof disposed between said member and said frame adjacent the juncture of the arms of the substantially L-shaped load carrying member; and means mounted on the free end of said load carrying member to support a load grasping means.

3. In combination, a lift truck having a vertically movable substantially L-shaped load-carrying member having a free end, means for shifting said load-carrying member from a horizontal to an upwardly inclined position and for supporting said load-carrying member in said upwardly inclined position, and a boom removably positioned upon the upwardly inclined free end of said load-carrying member, said boom comprising parallel sides interfitting with said load-carrying member and a converging portion extending beyond said load-carrying member when said boom is positioned on said load-carrying member, said converging portion to support a load-holding means.

4. In combination, a lift truck having a vertically movable substantially L-shaped load-carrying member having a free end, means for shifting said load-carrying member from a horizontal to an upwardly inclined position and for supporting said load-carrying member in said upwardly inclined position, and a boom removably positioned upon the upwardly inclined free end of said load-carrying member, said boom comprising parallel sides interfitting with said load-carrying member and a converging portion extending beyond said load-carrying member when said boom is positioned on said load-carrying member, said converging portion to support a load-holding means, and means on said boom in abutting relation with said load-carrying member to limit axial movement of said boom relative to said upwardly inclined load-carrying member.

5. In combination, a lift truck having a vertically movable frame and a substantially L-shaped load-carrying member having a free end, said load-carrying member being pivotally attached to said frame for shifting said load-carrying member from a horizontal to an upwardly inclined position, means for supporting said load-carrying member in an upwardly inclined position, and a boom removably positioned upon the upwardly inclined free end of said load-carrying member, said boom to support a load-holding means.

6. In combination, a lift truck having a vertically movable frame and a substantially L-shaped load-carrying member having a free end, said load-carrying member being pivotally attached to said frame for shifting said load-carrying member from a horizontal to an upwardly inclined position, means for supporting said load-carrying member in an upwardly inclined position, a boom removably positioned upon the upwardly inclined free end of said load-carrying member, said boom to support a load-holding means, and means on said boom in abutting relation with said load-carrying member to limit axial movement of said boom relative to said upwardly inclined load-carrying member.

GEORGE L. CLAPP.

REFERENCES CITED

The following references are of record in the file of this patent:

UNITED STATES PATENTS

| Number | Name | Date |
|---|---|---|
| 2,394,458 | Lull | Feb. 5, 1946 |
| 1,875,103 | Mosel | Aug. 30, 1932 |
| 2,068,825 | Stevenson | Jan. 26, 1937 |
| 2,386,759 | Ulm | Oct. 16, 1945 |
| 2,364,493 | Ulinski | Dec. 5, 1944 |
| 2,362,991 | Dahl | Nov. 21, 1944 |
| 615,924 | Thomlinson | Dec. 13, 1898 |
| 2,349,352 | Johnson | May 23, 1944 |
| 2,410,373 | Westervelt | Oct. 29, 1946 |